(12) United States Patent
Zhang et al.

(10) Patent No.: US 10,962,358 B2
(45) Date of Patent: Mar. 30, 2021

(54) METHOD AND APPARATUS FOR MEASURING WALL THICKNESS, OVALITY OF TUBULAR MATERIALS

(71) Applicants: Jinchi Zhang, Quebec (CA); James David Glascock, League City, TX (US)

(72) Inventors: Jinchi Zhang, Quebec (CA); James David Glascock, League City, TX (US)

(73) Assignees: Olympus America Inc., Center Valley, PA (US); Cudd Pressure Control, Inc., Woodlands, TX (US)

( * ) Notice: Subject to any disclaimer, the term of this patent is extended or adjusted under 35 U.S.C. 154(b) by 417 days.

(21) Appl. No.: 16/033,949

(22) Filed: Jul. 12, 2018

(65) Prior Publication Data

US 2020/0018593 A1 Jan. 16, 2020

(51) Int. Cl.
 *G01B 17/02* (2006.01)
 *G01B 17/06* (2006.01)
 *G01N 29/46* (2006.01)
(52) U.S. Cl.
 CPC ............. *G01B 17/02* (2013.01); *G01B 17/06* (2013.01); *G01N 29/46* (2013.01)
(58) Field of Classification Search
 None
 See application file for complete search history.

(56) References Cited

U.S. PATENT DOCUMENTS

| | | | |
|---|---|---|---|
| 5,077,908 A | 1/1992 | Moore | |
| 6,708,128 B2* | 3/2004 | Bankestrom | G01N 29/46 |
| | | | 702/183 |
| 7,093,469 B2* | 8/2006 | Yamane | B21B 37/78 |
| | | | 378/54 |
| 7,386,416 B2 | 6/2008 | Glasscock | |
| 2008/0071496 A1* | 3/2008 | Glascock | G01B 17/02 |
| | | | 702/155 |

OTHER PUBLICATIONS

D. Moore, J. Phys. E: Sci. Instrum. 22 (1989) 339-343.

* cited by examiner

*Primary Examiner* — Gregory J Toatley, Jr.
*Assistant Examiner* — Terence E Stifter, Jr.
(74) *Attorney, Agent, or Firm* — Schwegman Lundberg & Woessner, P.A.

(57) ABSTRACT

Disclosed is a system and method for ultrasonic measurement of the average diameter and roundness profile of a tube. A roundness algorithm represents the angular dependence of the tube surface profile as a sum of Fourier components, each component being a harmonic representing an integer number of undulations per revolution, with "0" (the first harmonic) corresponds to an average circle associated with the tube outer surface. A calibration block is used to calibrate the first harmonic, representing the average tube diameter.

20 Claims, 9 Drawing Sheets

METHOD AND APPARATUS FOR MEASURING WALL THICKNESS, OVALITY OF TUBULAR MATERIALS

FIELD OF THE INVENTION

The invention relates to methods and devices for measuring the dimensions and mechanical properties of pipes, tubes and the like. More particularly, it relates to an ultrasonic device and algorithm for measuring the deviation from the nominal tube diameter, without making any assumptions about the shape of the tube.

BACKGROUND OF THE INVENTION

The ideal cross-section of a pipe or tube is perfectly circular, providing maximum strength and ease of joining adjacent tubing sections. Methods of measuring deviation of tubes from roundness are known in the art.

Known roundness measurement methods are often performed using a displacement transducer mounted between two location members which contact the surface of the tube and locate the transducer. As the tube under test is rotated with respect to the transducer and the location members, the transducer measures a displacement which is a weighted combination of the departures from roundness of the transducer and the contact points of the two location members. The advantage of this geometrical arrangement is that the measurement can be done with just one transducer, precision rotary bearings are not required, the axis of the tube does not have to be accurately aligned to the axis of rotation, and access to only one side of the rotating tube is required.

Moore (J. Phys. E: Sci. Instrum. 22 (1989) 339-343 and U.S. Pat. No. 5,077,908) has presented design considerations and algorithms for such a geometrical arrangement. However, Moore is silent on the use of ultrasound transducers, which have the advantage that they are able to simultaneously measure the wall thickness and the deviation from roundness of the tube under test. Furthermore, Moore's algorithms are applied to a two-dimensional circular object with no consideration of any profile variations in the third dimension, which is the axial length of the tube.

Figure 1A:
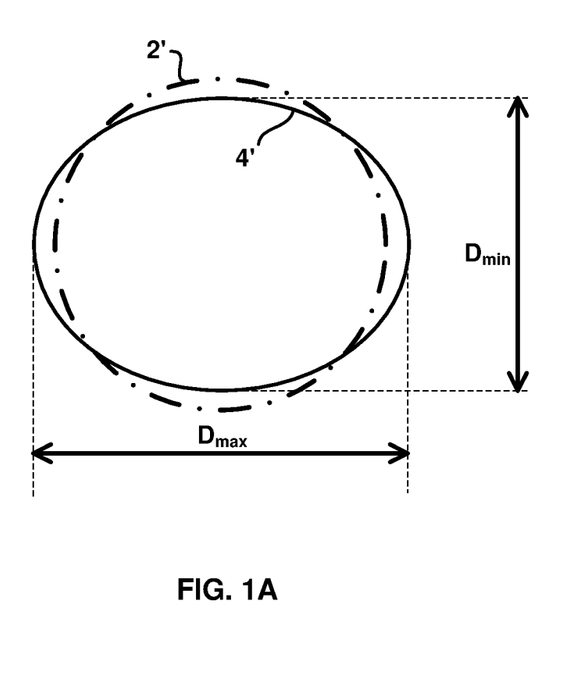
FIG. 1A is a schematic representation of an ovality measurement.

Glasscock (U.S. Pat. No. 7,386,416) teaches use of an ultrasonic probe for measuring wall thickness and ovality. However, Glasscock's method is capable of measuring only the maximum and minimum deviation from the average diameter of the tube, thereby calculating the ovality. FIG. 1A illustrates an ovality measurement of a tube 4' having a nominally circular outer surface 2'. According to the method of Glasscock, a maximum diameter $D_{max}$ and a minimum diameter $D_{min}$ of tube 4' may be measured along two perpendicular axes, and tube 4' is assumed to have an oval shape as illustrated in FIG. 1A.

Figure 1B:
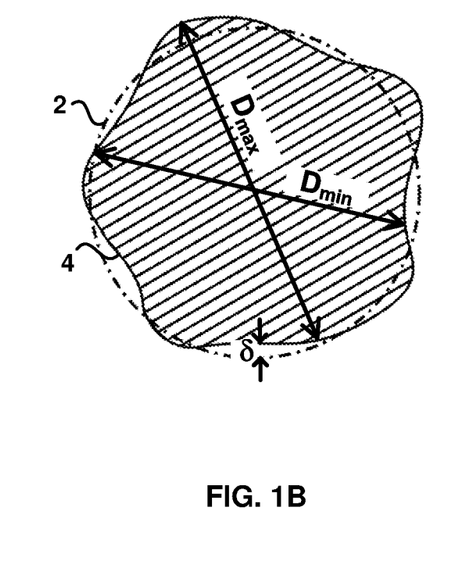
FIG. 1B is a schematic representation of a roundness measurement.

FIG. 1B illustrates a roundness measurement of a tube 4 whose diameter has non-oval deviations from an average circle 2, wherein average circle 2 is a circle having the average diameter of tube 4. Tube 4 is a better general representation than tube 4' of observed roundness deviations in tubes. Note, however, that the deviations from roundness of tube 4 have been exaggerated for clarity of presentation. Tube 4 may be characterized by the maximum diameter $D_{max}$ and the minimum diameter $D_{min}$, but measurement of deviations $\delta$ from average circle 2 for all positions around the circumference of tube 4 would provide a much better characterization. Measurements of such other, non-oval, deviations from roundness are not possible with the method of Glasscock.

In general, users wish to determine variations along the axial length of the average diameter of the tube, not merely the roundness profile which is a measure of deviations from a nominal tube diameter. A problem of ultrasonic roundness methods in existing practice is that the measurement of the average tube diameter has low precision, and there is no method to calibrate for higher accuracy.

There therefore exists a need for an ultrasonic method capable of measuring deviations from tube roundness as a function of axial position, while at the same time providing an accurate and calibrated measurement of the axial dependence of tube average diameter.

SUMMARY OF THE INVENTION

It is a general objective of the present disclosure to have a measurement system and an algorithm for roundness and average diameter which is capable of measuring the deviation from the nominal diameter of a tube, without making any assumptions about the shape of the tube.

The objective is achieved by measuring diameters of a random polygonal shape and then calculating the deviations from an averaged circle having a diameter equal to the average of all the diameter measurements.

The measurement system of the present disclosure uses ultrasound time-of-flight measurements to measure the diameter of the tube at a substantial number of angles around the tube (angles ranging from 0° to 360°).

The roundness algorithm of the present disclosure represents the functional dependence of diameter with angle as a sum of Fourier components, each component being a harmonic representing an integer number of undulations per revolution. The number of harmonics depends on the measurement accuracy required. The roundness is then calculated from the deviation of the Fourier sum from the averaged circle.

Note that the roundness algorithm of the present disclosure does not merely use the maximum and minimum diameters to determine the tube ovality. The roundness algorithm instead determines a number of harmonics 0, 2, . . . N, where the harmonic 0 corresponds to the diameter of the averaged circle, harmonic 2 corresponds to the ovality component, and higher harmonics complete the definition of the actual measured tube diameter angular profile.

A novel aspect of the present invention is that the roundness algorithm is not based on the assumption that the circles are oval or round, and does not use ovality to achieve the calculation of the thickness of the tube.

It is a further objective of the present disclosure to provide a calibration method allowing highly accurate measurements of the average diameter. This objective is achieved by providing a calibration block configured to provide the same ultrasonic path length as a perfectly round tube having the nominal diameter.

DETAILED DESCRIPTION OF PREFERRED EMBODIMENT

Figure 2A:
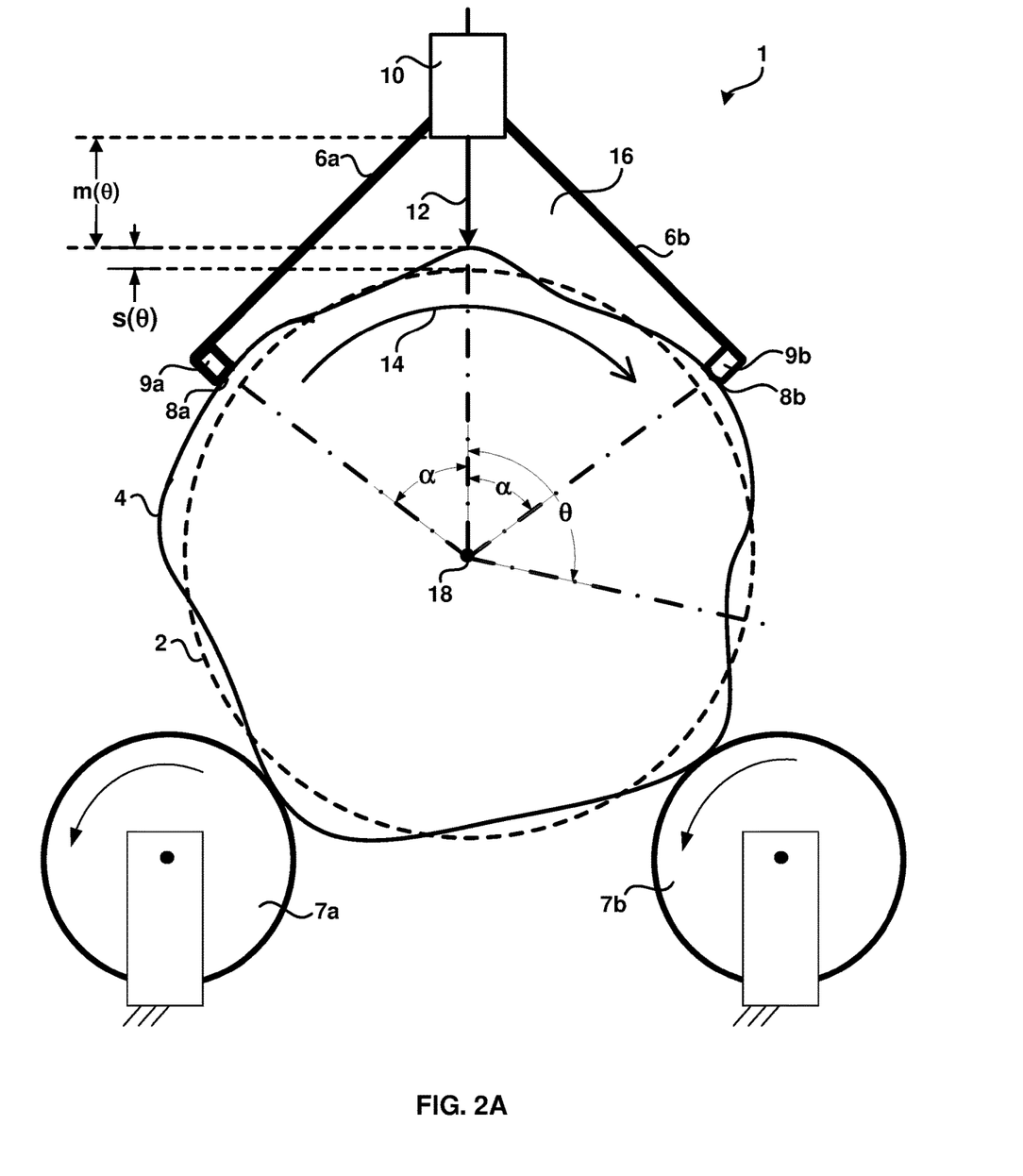
FIG. 2A is a schematic representation of a test measurement system for roundness profiling of a tube according to the present disclosure.

FIG. 2A is a schematic representation of a test measurement system 1 according to the present disclosure, wherein test measurement system 1 is used for measurement of roundness and average diameter of a tube 4 having a tube axis 18. Note that the deviations from roundness of tube 4 illustrated in FIG. 2 are not to scale, but have been exaggerated for the purpose of presentation. An ultrasonic probe 10 emits an ultrasonic beam 12 which measures time of flight (TOF) in a couplant fluid 16 between ultrasonic probe 10 and the outer surface of tube 4. Ultrasonic probe 10 may be a single probe or may be a linear probe array having the direction of the linear array substantially parallel to the axis of tube 4. In an embodiment, probe 10 may be a linear phased array probe having 168 elements and an active length of 139 mm, but other probe types are possible and all are within the scope of the present disclosure. Ultrasonic beam 12 may therefore be a single beam or a linearly scanned beam with the scanning direction substantially parallel to axis 18. Support frames 6a and 6b support ultrasonic probe 10 by contacting tube 4 at lines of contact 8a and 8b respectively, wherein lines of contact 8a and 8b are substantially parallel to axis 18 and are defined by the contact of contact bars 9a and 9b respectively with the surface of tube 4. Lines of contact 8a and 8b each subtend an angle α with respect to the direction of ultrasonic beam 12. Tube 4 is rotated about axis 18 as illustrated by an arrow 14, the rotation being effected by rollers 7a and 7b, and the rotation of tube 4 being represented by a rotation angle θ which varies from 0 to 2π during a single revolution of tube 4. Couplant fluid 16, which in an embodiment may be water, is retained in an enclosed space between probe 10, support frames 6a and 6b and tube 4. With knowledge of the sound velocity in couplant fluid 16, a time of flight measurement between ultrasonic probe 10 and the outer surface of tube 4 may be converted to a displacement measurement m(θ). The roundness profile of tube 4 is represented by s(θ), which is the dependence on angle θ of the deviation between the outer surface of tube 4 and an average circle 2.

Figure 2B:
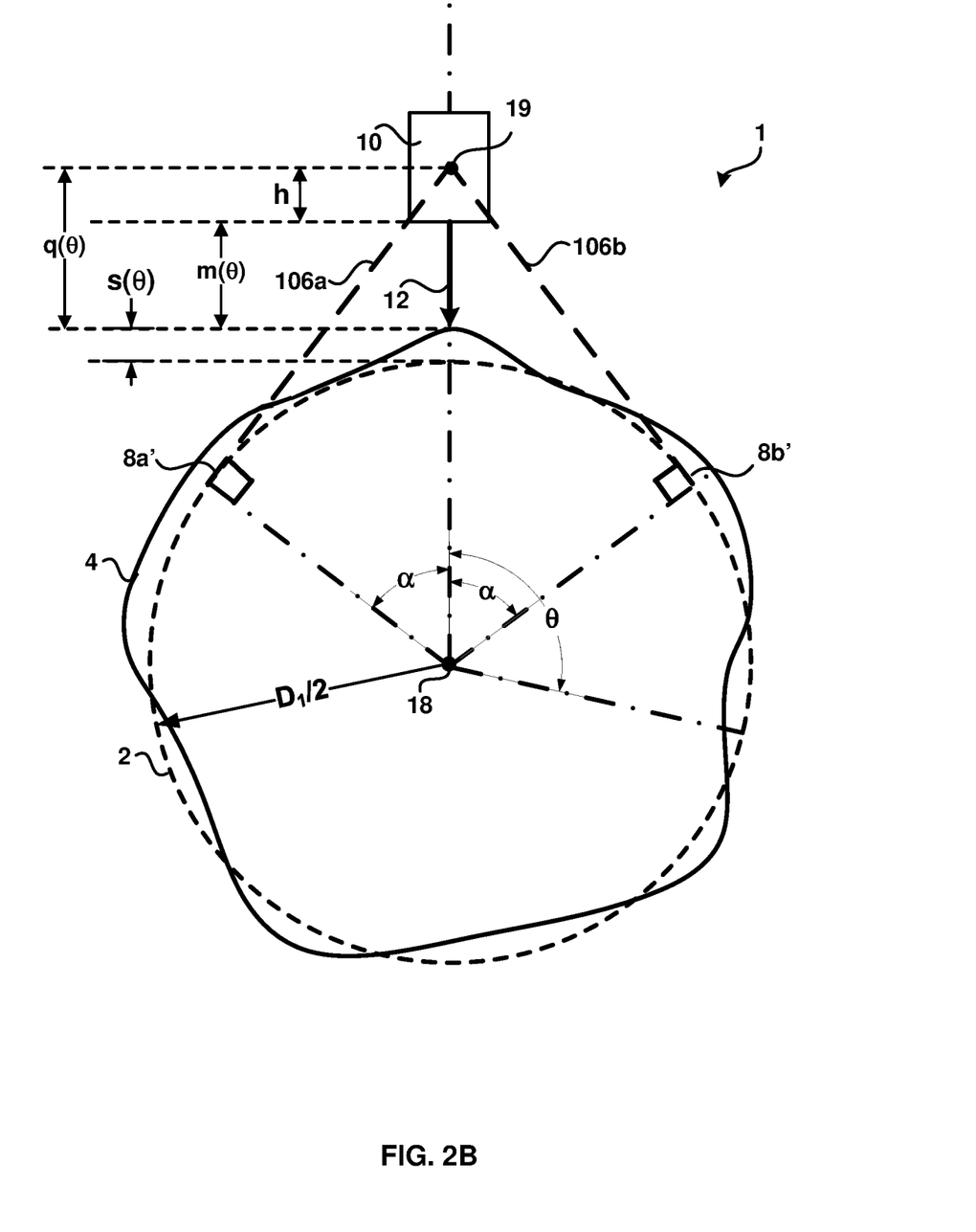
FIG. 2B is a schematic representation of parameters used for determination of the average diameter of a tube.

FIG. 2B is a schematic representation of parameters used for measurement of average circle 2, wherein average circle 2 is a circle having a diameter $D_1$, which is the average diameter of tube 4. A line 106a is tangential at a line of contact 8a' on average circle 2 and a line 106b is tangential at a line of contact 8b' on average circle 2, wherein lines of contact 8a' and 8b' both subtend angle α with respect to the direction of ultrasonic beam 12. Note that, under the assumption that roundness deviations between tube 4 and average circle 2 are small, lines of contact 8a' and 8b' are close to, but not exactly equivalent to, lines of contact 8a and 8b shown in FIG. 2A. Lines 106a and 106b intersect at an intersection 19, and a distance h is the distance between intersection 19 and the active surface of probe 10. A displacement q(θ) is the sum of displacement measurement m(θ) and distance h, and corresponds to the distance from intersection 19 to the surface of tube 4.

In order to determine diameter $D_1$, displacement q(θ) must be determined for all values of angle θ from 0 to 2π. It should be noted that distance h has no effect on the roundness measurement, but it does influence measurement of average circle diameter $D_1$. The value of distance h is not precisely known in practice. However by using a calibration block having the nominal tube diameter, an accurate measurement of average circle diameter $D_1$ may be made. The principle of the calibration is disclosed below with reference to equations (7), (8) and (9).

Displacement measurement q(θ) can be related with roundness profile s(θ) and the weighted roundness profile at the position of the two points of contact, s(θ−α) and s(θ+α), using the following equation:

$$q(\theta) = s(\theta) - \frac{s(\theta - \alpha) + s(\theta + \alpha)}{2\cos\alpha} \quad (1)$$

Figure 3:
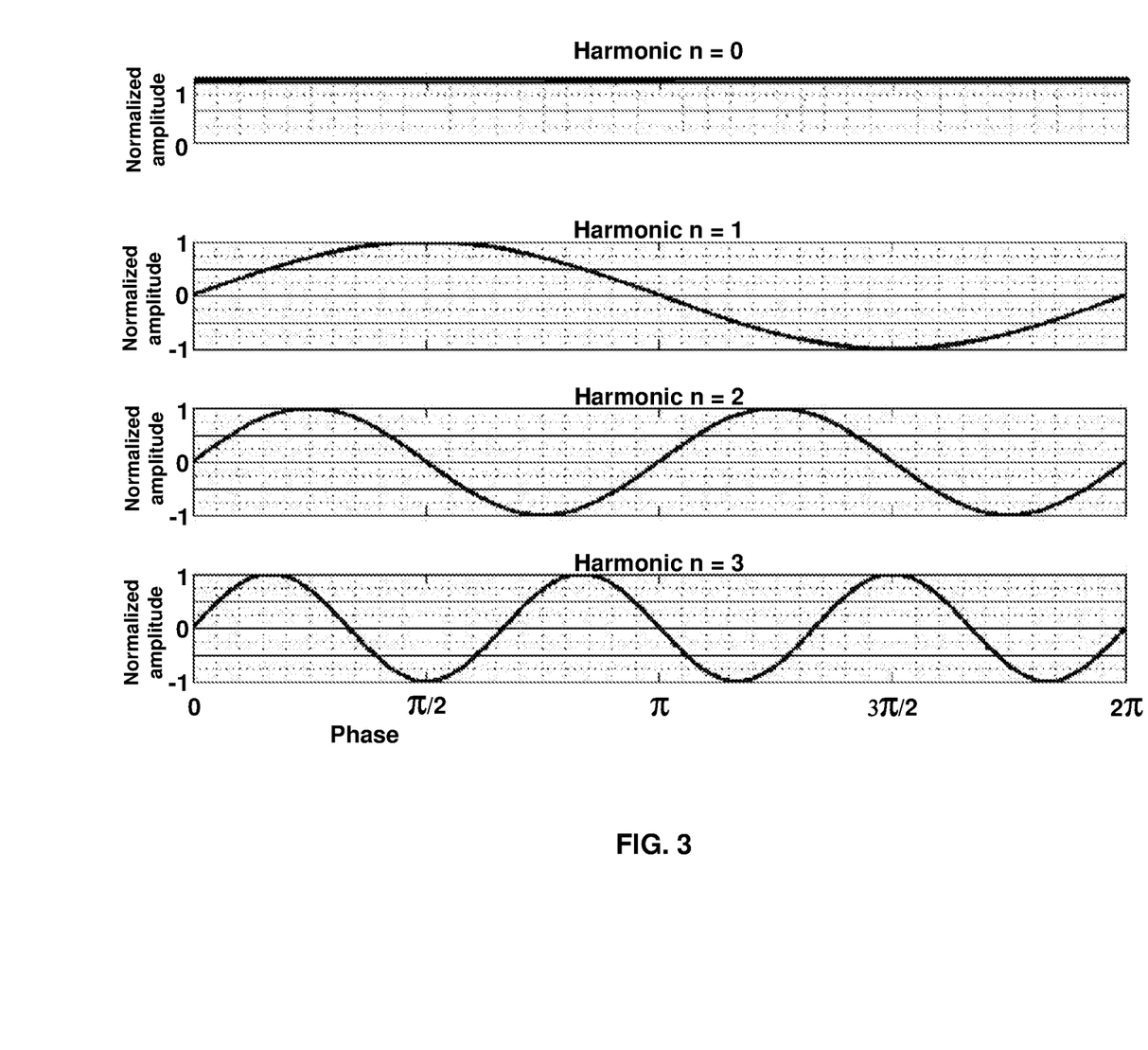
FIG. 3 shows a phase representation of the amplitude of undulations for the first 4 harmonics, n=0, 1, 2, and 3.

The functions q(θ) and s(θ) can be represented by a sum of Fourier components Q(n) and S(n), where n takes integer values known as harmonics, each harmonic representing the number of undulations per revolution of tube 4. FIG. 3 is a phase representation of the normalized amplitude of undulations for the first four harmonics, n=0, 1, 2 and 3. For simplicity in each case the initial phase is set to 0.

Figure 4:
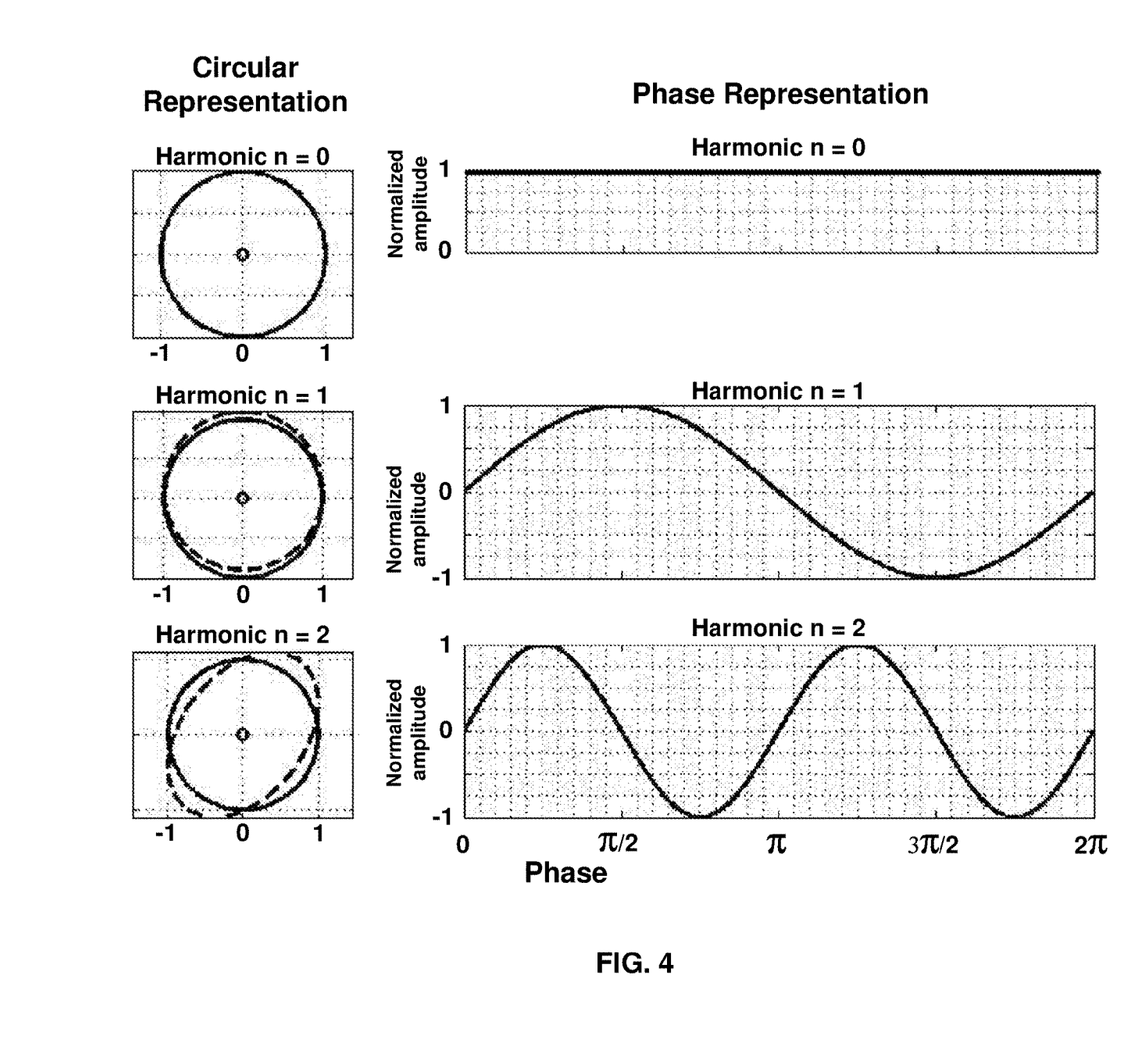
FIG. 4 shows a phase representation of the amplitude of undulations for the first 3 harmonics, n=0, 1, and 2, together with circular geometric representations of the tube profiles corresponding to each harmonic.

FIG. 4 shows the phase representation of the first three harmonics, n=0, 1, and 2, together with circular geometric representations of the tube profiles corresponding to each harmonic. In the circular representations, the circles with solid lines are representations of average circle 2, while figures with broken lines represent profiles of actual tube 4.

The first harmonic (n=0) corresponds to a perfect circle for which the amplitude is a constant value and the deviation s(θ) from roundness is zero all around the tube. The second harmonic (n=1) corresponds to a perfect circle which is not centered with respect to the axis of rotation. The dotted circle in the circular representation of harmonic n=1 shows an offset of tube 4 in the Y axis. The third harmonic (n=2) corresponds to tube 4 having an elliptical (oval) cross-section. The dotted ellipse in the circular representation of harmonic n=2 is centered with respect to the average circle 2. Higher harmonics (n>2) (not shown in FIG. 4) represent higher order variations in s(θ), representing roundness deviations which are non-oval.

Using the Fourier components Q(n) and S(n), for n=0, 2, . . . N, where N is the highest harmonic number, a harmonic sensitivity G(n) can be defined as:

$$G(n) = \frac{Q(n)}{S(n)} \quad (2)$$

where G(n) is the sensitivity of probe measurement Q(n) to the tube profile variation S(n) for the $n^{th}$ harmonic. G(n) is given by:

$$G(n) = 1 - \frac{\cos n\alpha}{\cos \alpha} \quad (3)$$

Therefore:

$$S(n) = \frac{Q(n)}{G(n)} = \frac{Q(n)}{1 - \frac{\cos(n\alpha)}{\cos\alpha}} \quad (4)$$

Note that since Q(n) is generally a complex number, S(n) is a complex number in phase with Q(n).

In order to calculate Q(n), a series of ultrasonic measurements q(k) is made as tube 4 is rotated (θ varies from 0 to 2π), where k is the sampling number and θ=k δθ, where δθ is the angular increment between samples. Q(n) is then derived as $$Q(n) = FFT\{q(k)\} \quad (5)$$

for k=1, 2, ... K, where K is the number of samples in one revolution of the tube, and where FFT{q(k)} is the Fast Fourier Transform (FFT) of the measurements q(k). The harmonics S(n) may then be calculated from equations (4) and (5), and finally the roundness profile of tube 4 is obtained using the Inverse Fast Fourier Transform of all harmonics S(n):

$$s(k) = FFT^{-1}\{S(n)\} \quad (6)$$

where $FFT^{-1}\{S(n)\}$ is the Inverse Fast Fourier Transform of S(n).

Note that not all harmonics can be used because those harmonics for which G(n) is very small may make the calculation unstable in the presence of signal noise. In particular, the second harmonic (n=1) cannot be used because G(1) is zero (see equation (3)). However, the second harmonic represents the displacement of tube 4 from the center of the nominal circle, which is not important for determination of roundness and average diameter. To avoid the problem of zero sensitivity for the second harmonic, the sensitivity for n=1 is set to $$\frac{1}{G(1)} = 0$$

for the Fourier Transform calculation.

In general, in order to obtain a precise profile of the outside surface of tube 4, it is necessary to have a large number of samples, meaning a small angular increment δθ between samples. It is also necessary to avoid harmonics n for which sensitivity factor G(n) is small or zero. This may be achieved by careful selection of the angle α subtended by lines of contact 8a and 8b with respect to the direction of ultrasonic beam 12. In an embodiment, α may be equal to 48°. In a second embodiment, α may be equal to 42°. However any other value of α may be advantageous, and all such values are within the scope of the present disclosure.

In order to avoid instabilities due to harmonics having small or zero sensitivity factor G(n), 1/G(n) may be set to zero for the Fourier Transform calculation for all values of G(n) less than a lower sensitivity limit. In an embodiment, the lower sensitivity limit may be 0.3, but other values of the lower sensitivity limit are possible, and all such values are within the scope of the present disclosure.

The Fourier Transform calculation may be performed for harmonics n=0, 1, 2, ... N, where N is the highest order harmonic allowed by the system design. For example, if G(n)>0.3, then according to Eq. 3, 1-cos(nα)/cos(α)>0.3. This relationship may be satisfied for some combinations of α and N. In general, the value of N should be as large as possible, and in any event should be greater than or equal to 6. Another design factor to consider is the size of the measuring mechanism. The larger the value of angle α, the larger the size of the measuring mechanism. Therefore there is a compromise between the size of the mechanism and the highest achievable harmonic number N. In an embodiment, with α=48°, the highest order harmonic may be N=13, but other values of the highest order harmonic are possible, and all such values are within the scope of the present disclosure.

Figure 5A:
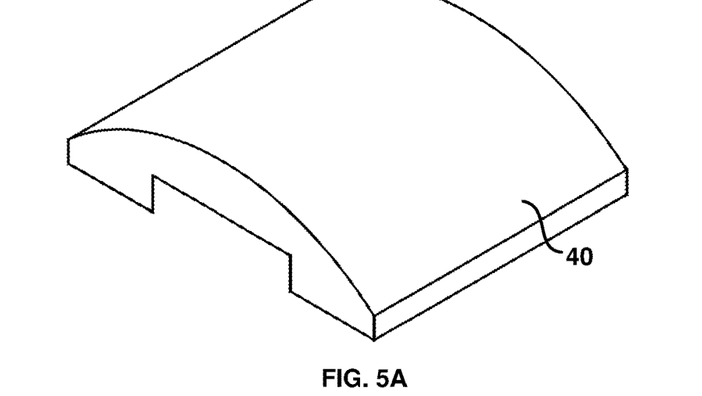
FIG. 5A is a diagram of a calibration block according to the present disclosure.
Figure 5B:
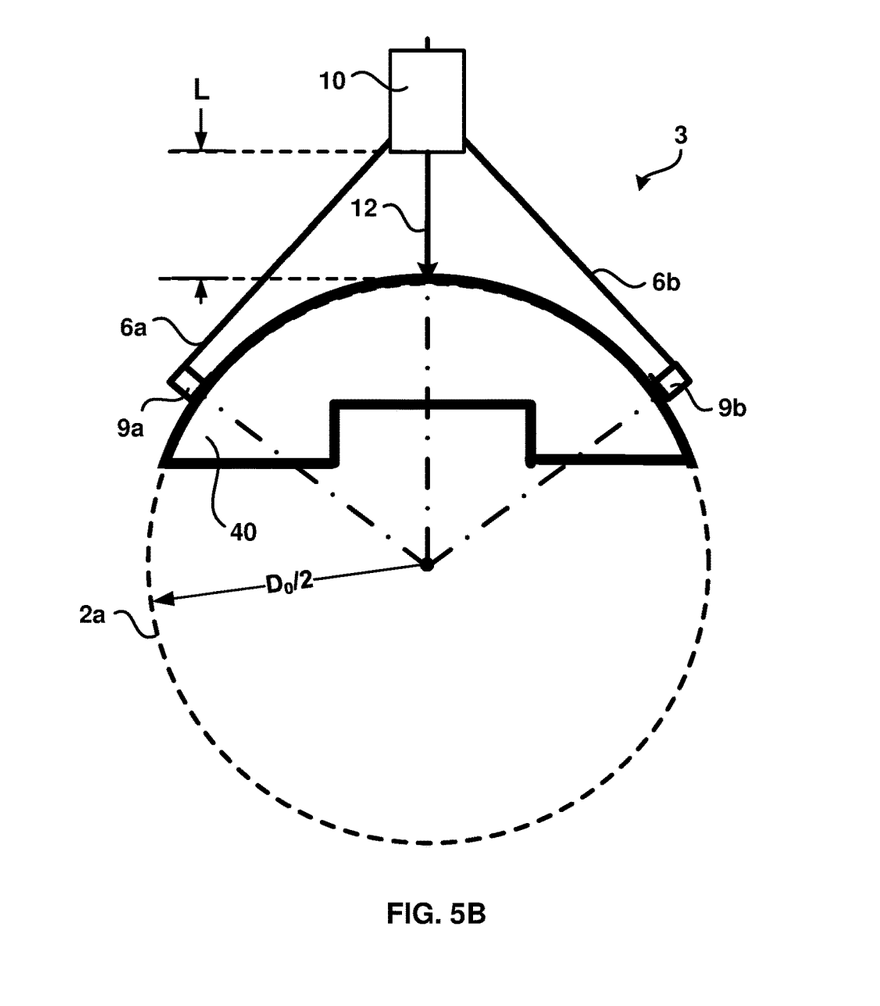
FIG. 5B is a schematic representation of a calibration system according to the present disclosure.

It is important to note that the distances, S(n), Q(n), s(k) and q(k), and the angle α, are all referenced to the diameter of average circle 2. With the assumption that the deviations from average circle 2 are small, only the first harmonic n=0 corresponds to the diameter of average circle 2. However, the diameter of average circle 2 cannot be accurately measured with test measurement system 1 because the exact length of the couplant column between probe 10 and the surface of tube 4 is difficult to measure, and the distance h (see FIG. 2B) is unknown. The inventors of the present disclosure have discovered that the accuracy of the average diameter measurement can be significantly improved by performing a calibration with a calibration system 3 using a calibration block 40 as shown in FIGS. 5A and 5B. Calibration block 40 is configured to allow stable and repeatable location on calibration block 40 of the measurement system comprising probe 10, support frames 6a and 6b and contact bars 9a and 9b. Calibration block 40 is further configured so that when the measurement system is located on calibration block 40, the acoustic path length from probe 10 to the surface of calibration block 40 accurately corresponds to a length L, wherein length L is the acoustic path length from probe 10 to a nominal circle 2a having a nominal diameter $D_0$ (see FIG. 5B). Note that nominal circle 2a, as defined by the geometry of calibration system 3, represents the nominal diameter of tube 4. However, nominal diameter $D_0$ may be different from average diameter $D_1$, which is the average tube diameter as measured with test measurement system 1. As illustrated in FIG. 5B, calibration block 40 has a cross-section which is part of nominal circle 2a. However, those skilled in the art may devise various forms and constructions of calibration block 40 in which the acoustic path length from probe 10 to the surface of calibration block 40 accurately corresponds to the length L, and all such forms and constructions are within the scope of the present disclosure.

Calibration according to the present disclosure is performed by measuring a calibration time of flight in couplant fluid 16 when probe 10 is coupled to calibration block 40. Note that calibration block 40 is not rotated during the calibration measurement. Probe 10 is then coupled to tube 4 which is rotated, and the measured average diameter $D_1$ (first harmonic) is compensated according to the calibration time of flight. The calibration allows an accurate measurement of the first harmonic n=0 corresponding to the actual average diameter $D_1$ of tube 4. The method of compensating the first harmonic according to the calibration time of flight is described below in connection with FIG. 6 and equations (7)-(11).

Figure 6:
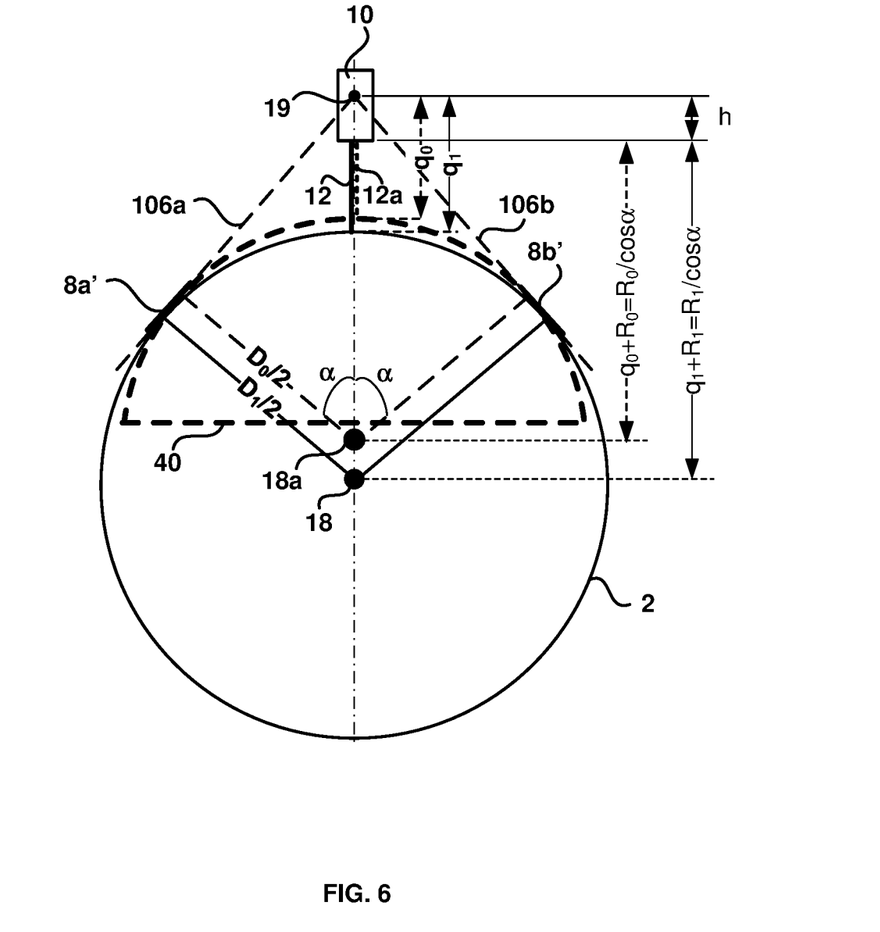
FIG. 6 is a diagram illustrating the principle of compensation of the measurement of the average diameter.

FIG. 6 illustrates the principle of compensation of the measurement of the first harmonic n=0 with calibration block 40. FIG. 6 shows a superposition of measurement parameters for calibration with calibration block 40 (having diameter $D_0$ and radius $R_0$) and subsequent measurement of tube 4 (having average diameter $D_1$ and average radius $R_1$). In FIG. 6, line 106a is tangential at line of contact 8a' to both average circle 2 and calibration block 40, and a line 106b is tangential at line of contact 8b' to both average circle 2 and calibration block 40. Note that axis 18 of average circle 2 may not coincide with the corresponding axis 18a of calibration block 40. Distances $q_0$ and $q_1$ are measured from intersection 19 to average circle 2 and calibration block 40 respectively. Therefore, the distance $q_0$–h represents a sound path 12a from the active surface of probe 10 to the surface of calibration block 40, and the distance $q_1$–h represents the sound path 12 from the active surface of probe 10 to the surface of tube 4. Sound paths 12 and 12a, and the difference Δq between them, can be calculated with equations (7), (8) and (9) below:

$$q_0 - h = TOF_0 \times V/2 \quad (7)$$

$$q_1 - h = TOF_1 \times V/2 \quad (8)$$

$$\Delta q = q_1 - q_0 = (TOF_1 - TOF_0) \times V/2 \quad (9)$$

where V is the sound velocity in couplant fluid 16, $TOF_0$ is the complete time of flight in the sound path $q_0$–h, and $TOF_1$ is the complete time of flight in the sound path $q_1$–h, wherein $TOF_1$ is derived as the average time of flight measured during a complete rotation of tube 4. The following equation may be derived from the geometrical relationships shown in FIG. 6:

$$D_1 = 2\Delta q \frac{\cos\alpha}{1 - \cos\alpha} + D_0, \quad (10)$$

where $D_0$ is the diameter of calibration block 40 (corresponding to the nominal diameter of tube 4) and $D_1$ is the average diameter of tube 4 (corresponding to the first harmonic n=0 that needs to be compensated).

Note that in equations (9) and (10) the dependence on unknown distance h has been eliminated, allowing an accurate determination of average diameter $D_1$.

From Equations (9) and (10), the following final expression is derived:

$$D_1 = (TOF_1 - TOF_0) \frac{V\cos\alpha}{1 - \cos\alpha} + D_0. \quad (11)$$

Equation (11) allows calibration of the measurement of average diameter $D_1$ by using calibration block 40.

Axial dependence of the roundness profile and the average diameter may be determined by having probe 10 as a single probe or a single aperture of a probe array and mechanically scanning tube 4 with a helicoidal scan. Alternatively, probe 10 may be a probe array producing an ultrasonic beam 12 which is linearly scanned in the axial direction, wherein axial dependence may be determined by a combination of beam scanning and/or mechanical scanning of tube 4.

Figure 7:
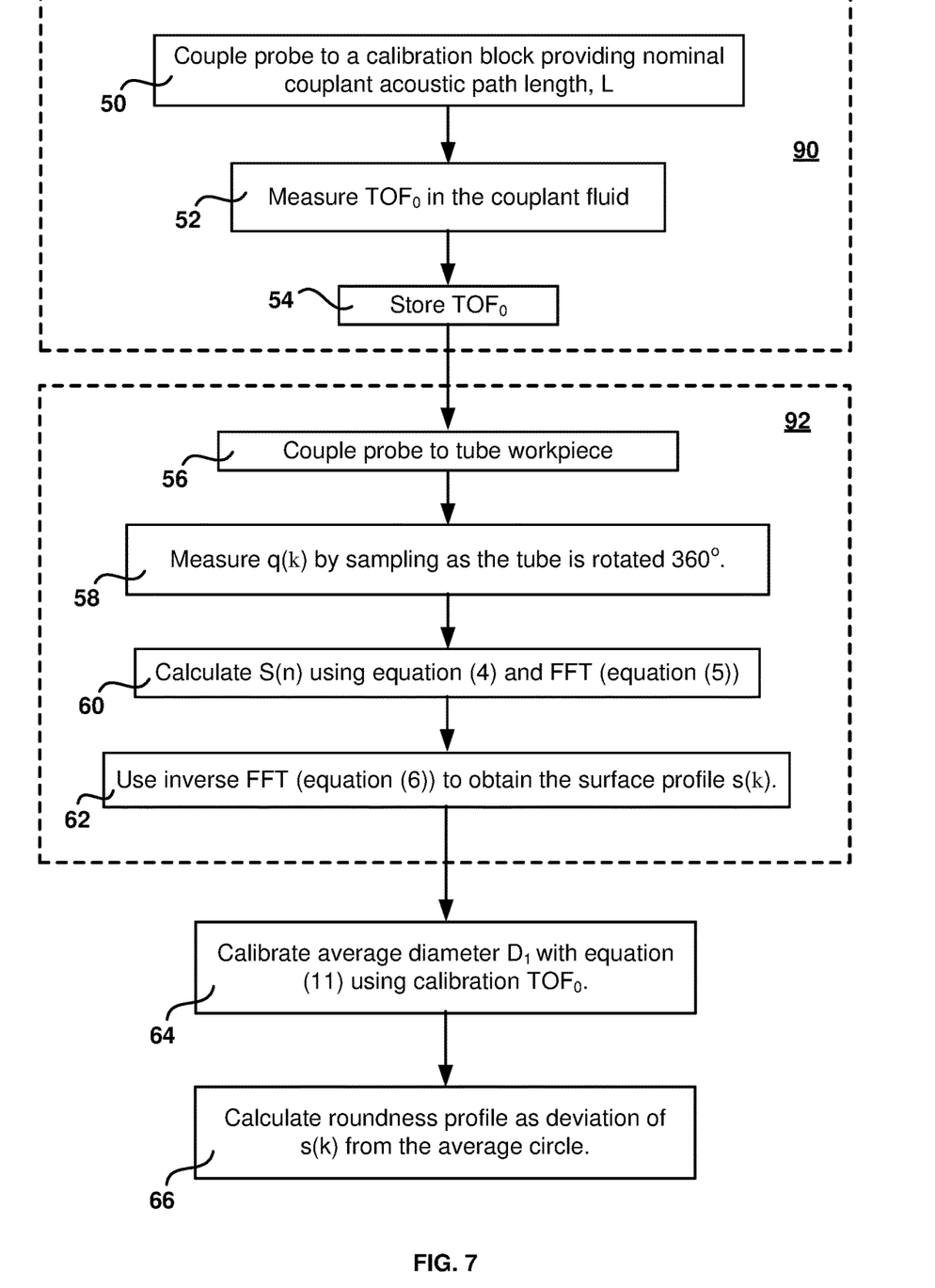
FIG. 7 is a flowchart of a method of measuring a roundness profile and an average diameter of a tube according to the present disclosure.

FIG. 7 is a flowchart of a method of measuring the roundness profile and average diameter of a tube according to the present disclosure. Steps 50, 52 and 54 are the steps of a calibration mode 90. In step 50, probe 10 is coupled to calibration block 40 so that the acoustic path length in couplant 16 between probe 10 and calibration block 40 is equal to the nominal acoustic path length L between probe 10 and nominal circle 2a. In step 52, calibration time of flight $TOF_0$ is measured between probe 10 and the surface of calibration block 40. In step 54, the calibration time of flight is stored for use in subsequent test measurements.

A test mode measurement 92 on a tube workpiece begins at step 56, in which probe 10 is coupled to tube 4. In step 58, a series of ultrasonic measurements q(k) is made as tube 4 is rotated 360°. In step 60, the $n^{th}$ harmonics Q(n) are derived from the Fast Fourier Transform of q(k), and the corresponding harmonics of the tube profile, S(n), are then calculated from equation (4). In step 62, the inverse FFT is applied to S(n) to derive the surface profile s(k) of tube 4.

In step 64, the calibrated average diameter $D_1$ is calculated using equation (11) with $TOF_0$ derived in calibration mode 90, and $TOF_1$ derived from the average time of flight for a complete rotation in test mode measurement 92. In step 66 the roundness profile is calculated as the deviation of s(k) from calibrated average circle 2.

Figure 8:
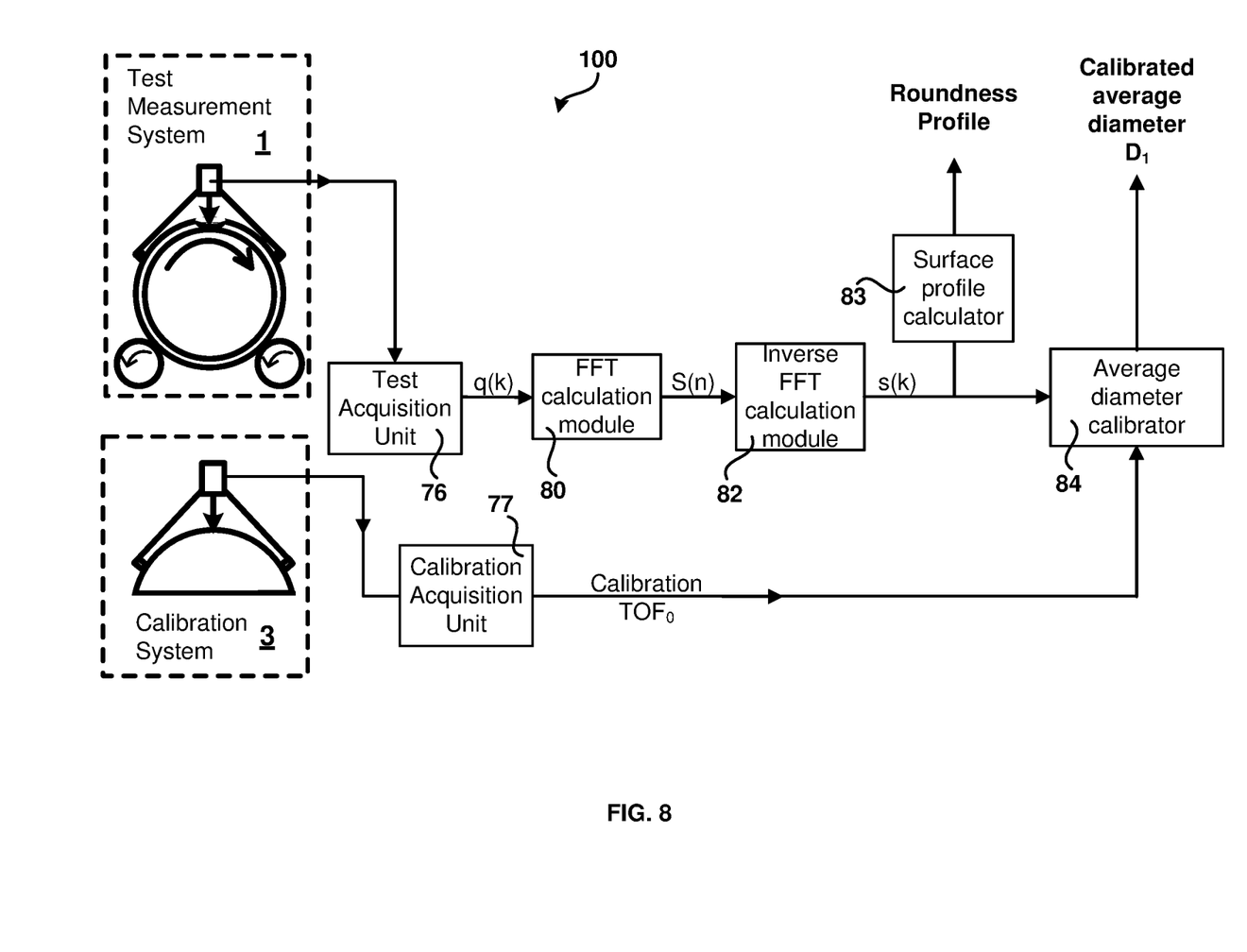
FIG. 8 is a schematic representation of a measurement system for measuring a roundness profile and an average diameter of a tube according to the present disclosure.

FIG. 8 is a schematic representation of a measurement system 100 for measuring the roundness profile and average diameter of a tube according to the present disclosure. Measurement system 100 comprises calibration system 3 with probe 10 coupled to calibration block 40. A calibration acquisition unit 77 acquires ultrasound signals from probe 10 and transmits calibration $TOF_0$ to an average diameter calibrator 84. Measurement system 100 further comprises test measurement system 1, which is deployed subsequent to the calibration measurement, and from which linear probe 10 transmits data to a test acquisition unit 76. Test acquisition unit 76 acquires a series of ultrasonic measurements q(k) as tube 4 is rotated 360°. A FFT calculation module 80 then performs a Fast Fourier Transform to obtain the harmonics S(n) of the profile of tube 4, and an Inverse FFT calculation module 82 performs an Inverse Fast Fourier Transform to obtain the surface profile s(k) of tube 4. A surface profile calculator 83 calculates the roundness profile of tube 4, wherein the roundness profile is the deviation of the outer surface of tube 4 from average circle 2, the deviation being measured as a function of θ. Average diameter calibrator 84 calibrates the average diameter $D_1$ (the first harmonic of s(k)) using the calibration $TOF_0$ from calibration system 3, by means of equation (11). Therefore the output from measurement system 100 is the roundness profile and calibrated average diameter $D_1$.

Although the present invention has been described in relation to particular embodiments thereof, it can be appreciated that various designs can be conceived based on the teachings of the present disclosure, and all are within the scope of the present disclosure.

What is claimed is:

1. A method of measuring a tube having a tube outer surface, the method comprising the steps of:
    providing a measurement assembly configured to be mounted on the tube outer surface and to hold at least one ultrasonic probe, the probe is configured to emit ultrasonic beams and receive response signal for the corresponding beams,
    causing relative rotation between the tube and the probe, the rotation being about a tube axis oriented along a tube axial direction, wherein an angle θ is an angle of rotation of the tube about the tube axis, and wherein angle θ is between 0° and 360°;
    measuring ultrasonic time of flight measurements, TOF (k), between the probe and the tube outer surface, wherein k is a sampling number and θ=kδθ, wherein δθ is an angular rotation increment between each ultrasonic time of flight measurement;
    converting the ultrasonic time of flight measurements to distance measurements, q(k), using a known couplant sound velocity;
    calculating a Fourier transform of q(k);

deriving harmonics, S(n), where n=0, 2, 3, ... N, where S(n) is a $n^{th}$ harmonic of a tube outer surface profile, N is a highest harmonic number and 0 corresponds to an average circle associated with the tube outer surface;

calculating an inverse Fourier transform of S(n) to derive the tube outer surface profile; and, calculating the roundness profile, wherein the roundness profile is a deviation of the tube outer surface profile from the average circle, the deviation being measured as a function of angle θ.

2. The method of claim 1 wherein the measurement assembly has a first support frame connected to a first contact bar and a second support frame connected to a second contact bar, wherein the first contact bar and the second contact bar are in contact with the tube outer surface at a first contact line and a second contact line respectively acoustically coupling an ultrasonic probe to the tube outer surface of the tube with a couplant fluid, one of the an ultrasonic beam from the probe being in a beam plane intersecting the tube axis, wherein the probe is supported, wherein a first plane joining the first contact line to the tube axis makes an angle −α with the beam plane, wherein a second plane joining the second contact line to the tube axis makes an angle α with the beam plane.

3. The method of claim 1 wherein the Fourier transform is a fast Fourier transform and the inverse Fourier transform is an inverse fast Fourier transform.

4. The method of claim 1 wherein the tube is translated in the axial direction and the roundness profile is calculated for a series of axial positions.

5. The method of claim 2 further comprising a step of calibration, which further comprises the steps of:

coupling the probe to a calibration block with the couplant fluid, wherein the probe is supported by the first support frame and the second support frame, and wherein the first contact bar and the second contact bar are in contact with the calibration block such that a calibration beam path in the beam plane between the probe and a calibration block surface corresponds to a nominal tube diameter; and, measuring a calibration time of flight in the couplant fluid from the probe to the calibration block surface and back to the probe.

6. The method of claim 5 further comprising a step of determining a calibrated average diameter in accordance with the equation $$D_1 = (TOF_1 - TOF_0)\frac{V\cos\alpha}{1 - \cos\alpha} + D_0$$

wherein $D_1$ is the calibrated average diameter, $D_0$ is the nominal tube diameter, $TOF_0$ is the calibration time of flight, $TOF_1$ is the average time of flight, and V is a couplant sound velocity.

7. The method of claim 1 wherein the probe is a linear probe having a plurality of elements configured as a plurality of transmission apertures and having a linear probe direction with a linear probe length oriented substantially parallel to the axial direction.

8. The method of claim 1 wherein the tube has a tube thickness and a tube inner surface, and wherein the tube thickness as a function of angle θ is determined from a tube sound velocity and thickness time of flight measurements between the tube outer surface and the tube inner surface.

9. A measurement apparatus for measuring a tube having a tube outer surface, the apparatus comprising, at least one ultrasonic probe, the probe is configured to emit ultrasonic beams and receive response signal for the corresponding beams, a measurement assembly configured to be mounted on the tube outer surface, to hold the probe and cause a relative rotation between the probe and the tube outer surface, the rotation being about a tube axis along a tube axial direction, wherein an angle θ is an angle of rotation of the tube about the tube axis, and wherein angle θ is between 0° and 360°, a test acquisition unit configured to measure ultrasonic time of flight measurements, TOF(k), between the probe and the tube outer surface, wherein k is a sampling number and θ=kδθ, wherein δθ is an angular rotation increment between each ultrasonic time of flight measurement, the test acquisition unit further configured to convert the ultrasonic time of flight measurements to distance measurements, q(k), using a known couplant sound velocity, a Fourier transform calculation module configured to calculate a Fourier transform of q(k) and to derive harmonics, S(n), where n=0, 2, 3, ... N, and where S(n) is a $n^{th}$ harmonic of a tube outer surface profile, N is a highest harmonic number, and 0 corresponds to an average circle associated with the tube outer surface;

an inverse Fourier transform calculation module configured to calculate an inverse Fourier transform of S(n) to derive the tube outer surface profile, a surface profile calculator configured to calculate the roundness profile, wherein the roundness profile is a deviation of the tube outer surface profile from the average circle, the deviation being measured as a function of θ.

10. The apparatus of claim 9 wherein the Fourier transform is a fast Fourier transform and the inverse Fourier transform is an inverse fast Fourier transform.

11. The apparatus of claim 9, wherein the tube is configured to rotate about the tube axis, and the measurement assembly is configured to hold the probe still.

12. The apparatus of claim 9 further comprises couplant applied between the probe and the outer surface.

13. The apparatus of claim 9 wherein the measurement assembly further comprises a first support frame connected to a first contact bar and a second support frame connected to a second contact bar, wherein the first contact bar and the second contact bar are in contact with the tube outer surface at a first contact line and a second contact line respectively acoustically coupling an ultrasonic probe to the tube outer surface of the tube with a couplant fluid, one of the an ultrasonic beam from the probe being in a beam plane intersecting the tube axis, wherein the probe is supported, wherein a first plane joining the first contact line to the tube axis makes an angle −α with the beam plane, wherein a second plane joining the second contact line to the tube axis makes an angle α with the beam plane.

14. The apparatus of claim 9, further comprising a calibration module and a calibration block, wherein during a calibration mode, the probe is coupled to the calibration block with the couplant fluid, wherein the probe is supported by the first support frame and the second support frame, and wherein the first contact bar and the second contact bar are in contact with the calibration block such that a calibration beam path in the beam plane between the probe and a calibration block surface corresponds to a nominal tube diameter; and, a calibration acquisition unit configured to measure a calibration time of flight from the probe to the calibration block surface and back to the probe.

15. The apparatus of claim 14 further comprising an average diameter calibrator configured to calculate a calibrated average diameter in accordance with the equation $$D_1 = (TOF_1 - TOF_0)\frac{V\cos\alpha}{1-\cos\alpha} + D_0$$

wherein $D_1$ is the calibrated average diameter, $D_0$ is the nominal tube diameter, $TOF_0$ is the calibration time of flight, $TOF_1$ is the average time of flight, and V is a couplant sound velocity.

16. The apparatus of claim 9 wherein the tube is translated in the axial direction and the roundness profile and the average diameter are calculated for a series of axial positions.

17. The apparatus of claim 14 wherein the probe is a linear probe having a plurality of elements configured as a plurality of transmission apertures and having a linear probe direction with a linear probe length oriented substantially parallel to the axial direction.

18. The apparatus of claim 17 wherein the plurality of transmission apertures is a single transmission aperture.

19. The apparatus of claim 18 wherein the ultrasonic beam is scanned in the axial direction.

20. The apparatus of claim 14 wherein the probe is a single probe.

* * * * *